United States Patent
Rodwell et al.

(10) Patent No.: US 10,895,244 B2
(45) Date of Patent: Jan. 19, 2021

(54) JOINT INTERFACE FOR WIND TURBINE ROTOR BLADE COMPONENTS

(71) Applicant: General Electric Company, Schenectady, NY (US)

(72) Inventors: Andrew Mitchell Rodwell, Greenville, SC (US); Thomas Merzhaeuser, Munich (DE); Scott Jacob Huth, Greenville, SC (US)

(73) Assignee: General Electric Company, Schenectady, NY (US)

( * ) Notice: Subject to any disclaimer, the term of this patent is extended or adjusted under 35 U.S.C. 154(b) by 203 days.

(21) Appl. No.: 16/140,900

(22) Filed: Sep. 25, 2018

(65) Prior Publication Data

US 2020/0095978 A1 Mar. 26, 2020

(51) Int. Cl.
*F03D 1/06* (2006.01)

(52) U.S. Cl.
CPC ......... *F03D 1/0683* (2013.01); *F03D 1/0641* (2013.01); *F05B 2230/23* (2013.01); *F05B 2280/6003* (2013.01)

(58) Field of Classification Search
CPC ... F03D 1/0675; F03D 13/10; B29D 99/0028; B29D 99/0003; B33Y 80/00; Y02P 70/523; Y02E 10/721; B29L 2031/085; B29K 2995/0082; B29K 2105/06; F05B 2280/6003; F05B 2230/24; B29C 64/106; B29C 33/0016; B29C 51/10; B29C 51/12; B29C 51/266; B29C 70/52; B29C 70/865
See application file for complete search history.

(56) References Cited

U.S. PATENT DOCUMENTS

| | | | |
|---|---|---|---|
| 8,905,718 B2 * | 12/2014 | Hayden | F03D 1/065 416/224 |
| 9,745,956 B2 | 8/2017 | Johnson et al. | |
| 2011/0135485 A1 | 6/2011 | Wang | |
| 2013/0216388 A1 * | 8/2013 | Akhtar | F03D 1/0675 416/226 |
| 2016/0146184 A1 | 5/2016 | Caruso et al. | |
| 2017/0021575 A1 * | 1/2017 | Hansen | B29C 70/22 |
| 2017/0218918 A1 * | 8/2017 | Cieslak | B32B 5/26 |
| 2018/0223797 A1 | 8/2018 | Caruso et al. | |
| 2018/0238301 A1 | 8/2018 | Tobin et al. | |

FOREIGN PATENT DOCUMENTS

| | | |
|---|---|---|
| EP | 2 217 748 A1 | 8/2010 |
| EP | 3 360 670 A1 | 8/2018 |
| WO | WO 2018/029240 A1 | 2/2018 |

OTHER PUBLICATIONS

PCT Search Report and Written Opinion, dated Dec. 20, 2019.

* cited by examiner

*Primary Examiner* — Kenneth J Hansen
*Assistant Examiner* — Maxime M Adjagbe
(74) *Attorney, Agent, or Firm* — Dority & Manning, P.A.

(57) ABSTRACT

A rotor blade component for a wind turbine includes a first structural component, such as a spar cap, formed from a plurality of stacked pultruded members. A second structural component, such as a shear web, is fixed to the first structural component at a joint interface. One or more webs form the joint interface, wherein each of the webs has a first section bonded between at least two of the pultruded members in the first structural component and a second section extending across the joint interface and bonded onto or into the second structural component.

13 Claims, 5 Drawing Sheets

JOINT INTERFACE FOR WIND TURBINE ROTOR BLADE COMPONENTS

FIELD

The present subject matter relates generally to wind turbine rotor blades and, more particularly, to joint structures between components of the wind turbine rotor blade.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades generally include a body shell formed by two shell halves of a composite laminate material. The shell halves are generally manufactured using molding processes and then coupled together along the corresponding ends of the rotor blade. In general, the body shell is relatively lightweight and has structural properties (e.g., stiffness, buckling resistance, and strength) which are not configured to withstand the bending moments and other loads exerted on the rotor blade during operation. In addition, wind turbine blades are becoming increasingly longer in order to produce more power. As a result, the blades must be stiffer and thus heavier so as to mitigate loads on the rotor.

To increase the stiffness, buckling resistance, and strength of the rotor blade, the body shell is typically reinforced using one or more structural components (e.g. opposing spar caps with a shear web configured therebetween) that engage the inner surfaces of the shell halves. The spar caps may be constructed of various materials, including but not limited to glass fiber laminate composites and/or carbon fiber laminate composites. Such materials, however, can be difficult to control, defect prone, and/or highly labor intensive due to handling of the dry and pre-preg fabrics and the challenges of infusing large laminated structures.

As such, spar caps may also be constructed of pre-fabricated, pre-cured (i.e. pultruded) composites that can be produced in thicker sections, and are less susceptible to defects. In addition, the use of pultrusions in spar caps can decrease the weight and may also increase the strength thereof. Accordingly, the pultruded composites can eliminate various concerns and challenges associated with using dry fabric alone. As used herein, the terms "pultruded composites," "pultrusions," "pultruded members" or similar generally encompass reinforced materials (e.g. fibers or woven or braided strands) that are impregnated with a resin and pulled through a stationary die such that the resin cures or undergoes polymerization through added heat or other curing methods. As such, the process of manufacturing pultruded composites is typically characterized by a continuous process of composite materials that produces composite parts having a constant cross-section. A plurality of pultrusions can then be joined together to form the spar caps and/or various other rotor blade components.

The benefits of using pultruded plates in spar caps have been realized and spar caps formed using pultrusions usually include pultrusion-formed layers bonded together via a resin material. More specifically, spar caps are generally formed of a plurality of stacked pultruded plates that are bonded together in a mold.

The interface or joint between the spar caps (pultruded or non-pultruded) and shear web is a critical structural interface for both box-beam and I-beam spar constructions. With conventional configurations, this joint relies primarily on the strength of an adhesive or resin deposited at the interface of the components. Event with the benefits of pultruded spar caps, the interface between the spar cap and shear web can be a limiting structural aspect of the blade.

The art is continuously seeking new and improved methods of manufacturing rotor blade components and structural elements with increased strength and decreased weight. A spar configuration wherein pultruded spar caps can also be integrated into an improved structural interface between the spar caps and shear webs would be an advantageous advancement in the art.

BRIEF DESCRIPTION

Aspects and advantages of the invention will be set forth in part in the following description, or may be obvious from the description, or may be learned through practice of the invention.

In one aspect, the present disclosure is directed to a rotor blade component for a wind turbine having an improved joint interface configuration. The component includes a first structural component formed from a plurality of stacked pultruded members. In a particular embodiment, this first structural component may be, for example, a spar cap. A second structural component is fixed to the first structural component at a joint interface. This second structural component may be, for example, a shear web. One or more webs are used to fix the first and second components together at the joint interface, each of the webs comprising a first section and a second section. In one embodiment, the first section of at least a first one of the plurality of webs extends along and is bonded to a top outer surface of the stacked pultruded members with the second section extending across the joint interface and bonded to the second structural component.

In an additional embodiment, the first section of a second one of the plurality of webs extends along and is bonded to a bottom outer surface of the stacked pultruded members with the second section extending across the joint interface and bonded to the second structural component.

In addition, in a further embodiment, one or more additional ones of the webs has a first section bonded between at least two of the pultruded members in the first structural component and a second section extending across the joint interface and bonded onto or into the second structural component.

In an alternate embodiment, the joint interface may be provided by a plurality of the webs that weave between different ones of the pultruded members in the first structural component with or without the webs that extend along the top or bottom outer surfaces of the stacked pultruded components.

The improved joint interface structure has particular usefulness when configured between a spar cap and a shear web in a box-beam or I-beam spar, wherein the spar cap is formed by the pultruded members and the shear web is a unitary or multi-element component. However, the joint interface structure is not limited to this use or location, and may be used between any structural components within the wind turbine.

The webs may be variously formed. In one embodiment, each web includes one or layers of a woven or non-woven fabric material that is sufficiently pliant to weave around the joint interface or between the pultruded members at the first section and to extend onto or into the second structural member. The fabric layers may be bonded between or to the pultruded members with an adhesive or resin during formation of the first structural member. The fabric material layers may be bonded between the pultruded members during a vacuum thermo-forming process.

In a particular embodiment, the fabric material layers may be impregnated with a resin or adhesive and also serve a primary purpose of adhering or bonding the pultruded members together to form the first structural member. In this embodiment, the webs would extend entirely throughout the width and length of the first structural member between adjacent rows and/or columns of the pultruded members.

The second structural component may be a unitary member, wherein the second section of each of the plurality of webs extends alongside an outer surface of the second structural component. The second sections of multiple webs may overlap along the outer surface of the second structural component.

In an alternate embodiment, the second structural component comprises a plurality of bonded-together components, wherein the second section of at least one of the plurality of webs extends between two or more of the bonded-together components.

The pultruded members may be arranged in various configurations within the first structural component. For example, the pultruded members may be arranged in stacked rows in the first structural component, wherein the first section of at least one of the plurality of webs is bonded between two adjacent stacked rows. The first section of at least one of the webs may be bonded between each of the stacked rows in the configuration.

The pultruded members may be further arranged in adjacent columns within the first structural member, wherein the first section of at least one of the plurality of webs is bonded between the pultruded members at different height positions in adjacent ones of the columns. This web may weave between the columns at a different height between adjacent columns.

It should be appreciated that the first section of a plurality of the webs may weave between any combination of the stacked rows and columns of pultruded members within the first structural component.

In certain embodiments, the first sections of multiple webs may be joined together within the first structural component. Alternatively, the first section of one or more of the webs may include a plurality of branches, wherein each branch extends between different pairs of the pultruded members.

The present disclosure also encompasses various methodologies for fixing a first structural component, such as a spar cap, to a second structural component, such as a shear web, with one or more webs, wherein the first structural component is formed with a plurality of stacked pultruded members. The method includes bonding a first section of at least one of the plurality of webs onto a top outer surface of the stacked pultruded members and bonding the second section across the joint interface and onto the second structural component. In a further method embodiment, a first section of a second one of the webs is bonded onto a bottom outer surface of the stacked pultruded members and the second section is bonded across the joint interface and onto the second structural component.

In addition to the above method or standing alone, an embodiment of the method may include bonding the first section of one or more of the webs between at least two of the pultruded members in the first structural component and bonding the second section across the joint interface and onto or into the second structural component.

In a particular embodiment of the method, the first structural component is a spar cap, and the second structural component is a shear web.

In a certain embodiment, the method includes bonding the second section of each of a plurality of webs alongside an outer surface of the shear web, wherein one or more of the second sections overlap along the outer surface of the shear web.

The pultruded members may be arranged in stacked rows and columns in the spar cap, wherein the method includes weaving the first section of at least one of the plurality of webs between any combination of the stacked rows and columns of pultruded members.

The method may include bonding the first section of at least one of the webs along an outer surface of each of a top and bottom row of the stacked pultruded members. These webs may also extend alongside an outer surface of the second structural member.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
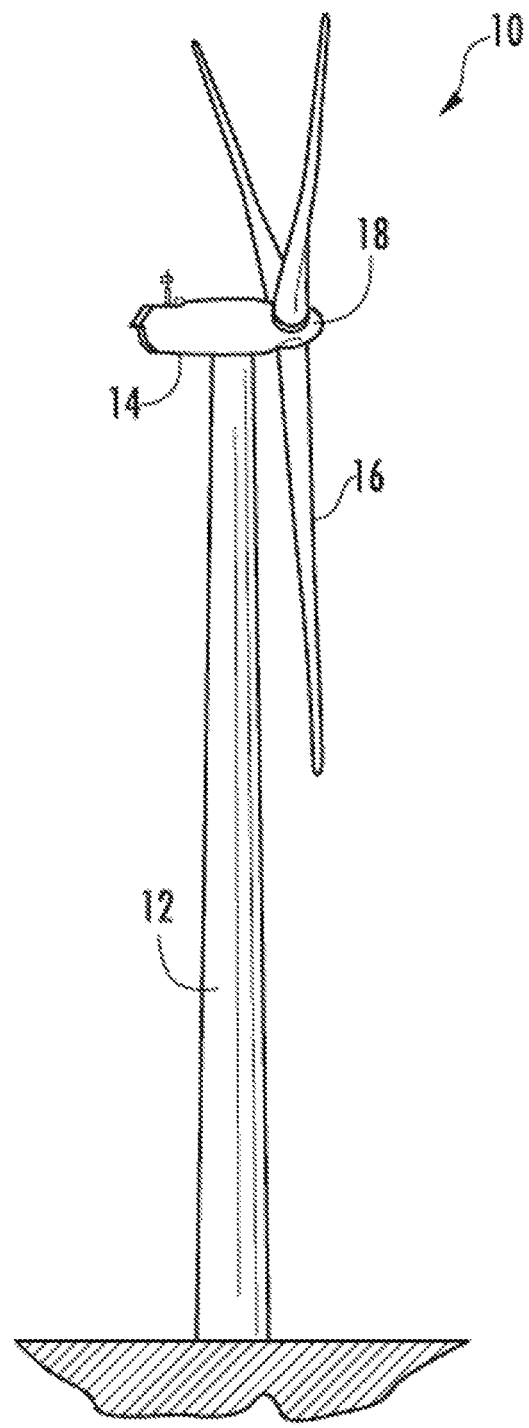
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to wind turbine rotor blade components having improved joint interfaces, and methods of manufacturing the same. Although not limited to such, the inventive joint interface constructions are particularly useful for the critical structural interface between the shear web and spar caps in a spar configuration. As mentioned, with conventional constructions, this critical interface relies primarily on an adhesive or resin application at the interface between the end of the shear web and the spar cap. The novel joint interface construction in accordance with the present disclosure uses a plurality of webs, for example fabric material webs, that bridge the joint. The webs may be bonded to the outer surfaces of the structural components at the joint interface, and one or more additional webs may be woven between separate members of the structural components, such as between pultruded members of a spar cap. An opposite end section of the webs are bonded along the sides of the shear web or within the shear web, for example between individual structural members forming the shear web. This unique joint interface construction provides a stronger joint capable of transferring larger loads as compared to the conventional construction, which in turn enables lighter and less costly blades or longer blades and blade beam components before reaching material limits, which can reduce the overall cost of electricity produced by the wind turbine.

Referring now to the drawings, FIG. 1 illustrates a perspective view of a horizontal axis wind turbine 10. It should be appreciated that the wind turbine 10 may also be a vertical-axis wind turbine. As shown in the illustrated embodiment, the wind turbine 10 includes a tower 12, a nacelle 14 mounted on the tower 12, and a rotor hub 18 that is coupled to the nacelle 14. The tower 12 may be fabricated from tubular steel or other suitable material. The rotor hub 18 includes one or more rotor blades 16 coupled to and extending radially outward from the hub 18. As shown, the rotor hub 18 includes three rotor blades 16. However, in an alternative embodiment, the rotor hub 18 may include more or less than three rotor blades 16. The rotor blades 16 rotate the rotor hub 18 to enable kinetic energy to be transferred from the wind into usable mechanical energy, and subsequently, electrical energy. Specifically, the hub 18 may be rotatably coupled to an electric generator (not illustrated) positioned within the nacelle 14 for production of electrical energy.

Figure 2:
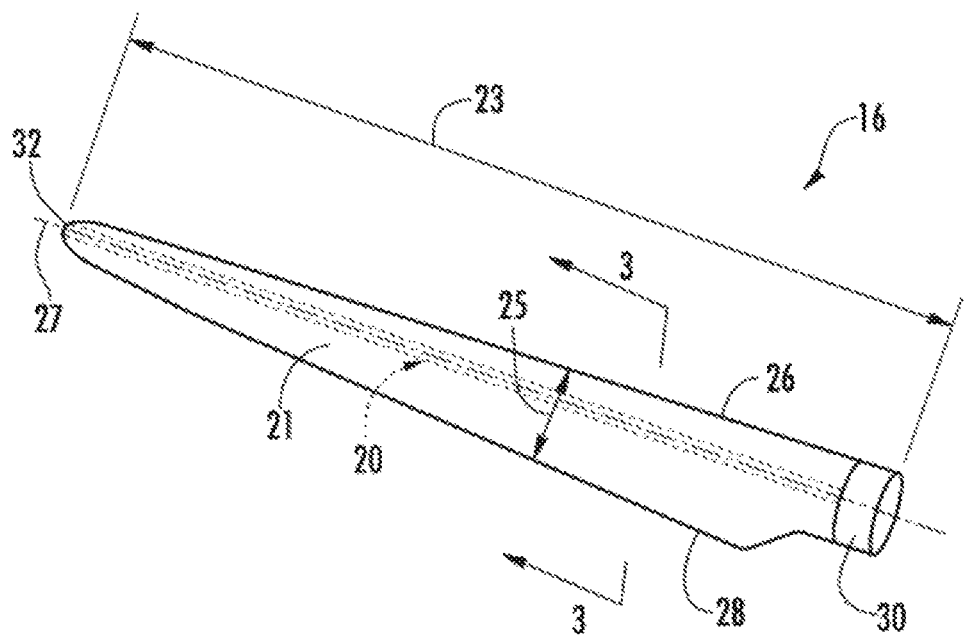
FIG. 2 illustrates a perspective view of one of the rotor blades of FIG. 1.
Figure 3:
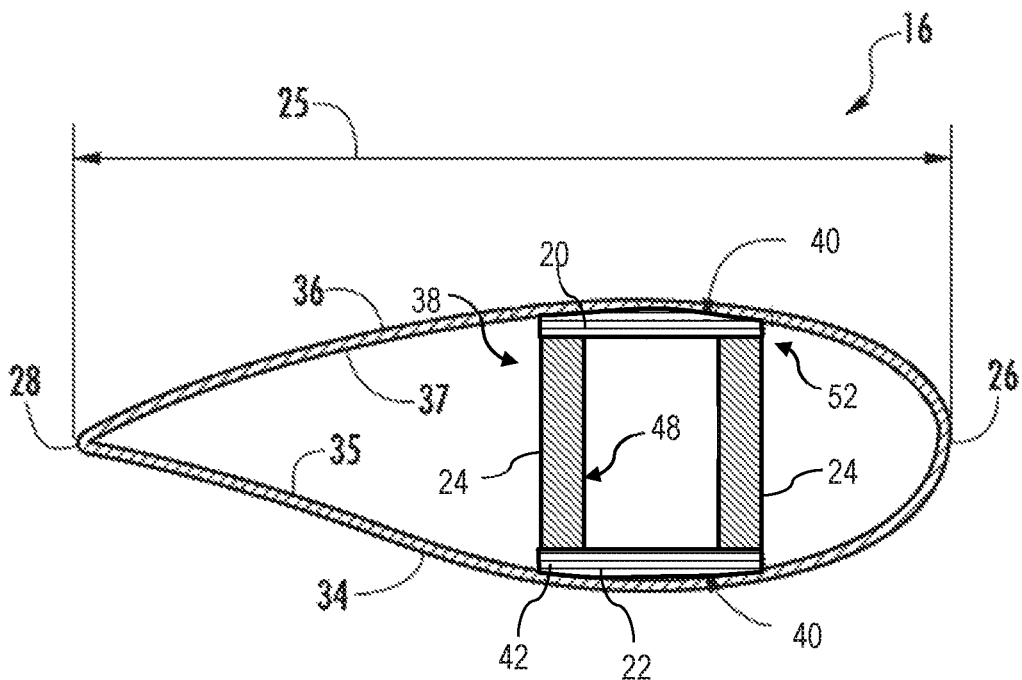
FIG. 3 illustrates a cross-sectional view of the rotor blade of FIG. 2 along line 3-3, and particularly illustrates a box-beam spar with pultruded spar caps.

Referring to FIGS. 2 and 3, one of the rotor blades 16 of FIG. 1 is illustrated in accordance with aspects of the present subject matter. In particular, FIG. 2 illustrates a perspective view of the rotor blade 16, whereas FIG. 3 illustrates a cross-sectional view of the rotor blade 16 along the sectional line 3-3 shown in FIG. 2. As shown, the rotor blade 16 generally includes a blade root 30 configured to be mounted or otherwise secured to the hub 18 (FIG. 1) of the wind turbine 10 and a blade tip 32 disposed opposite the blade root 30. A body shell 21 of the rotor blade generally extends between the blade root 30 and the blade tip 32 along a longitudinal axis 27. The body shell 21 may generally serve as the outer casing/covering of the rotor blade 16 and may define a substantially aerodynamic profile, such as by defining a symmetrical or cambered airfoil-shaped cross-section. The body shell 21 may also define a pressure side 34 and a suction side 36 extending between leading and trailing ends 26, 28 of the rotor blade 16. Further, the rotor blade 16 may also have a span 23 defining the total length between the blade root 30 and the blade tip 32 and a chord 25 defining the total length between the leading edge 26 and the trialing edge 28. As is generally understood, the chord 25 may vary in length with respect to the span 23 as the rotor blade 16 extends from the blade root 30 to the blade tip 32.

In several embodiments, the body shell 21 of the rotor blade 16 may be formed as a single, unitary component. Alternatively, the body shell 21 may be formed from a plurality of shell components. For example, the body shell 21 may be manufactured from a first shell half generally defining the pressure side 34 of the rotor blade 16 and a second shell half generally defining the suction side 36 of the rotor blade 16, with such shell halves being secured to one another at the leading and trailing ends 26, 28 of the blade 16. Additionally, the body shell 21 may generally be formed from any suitable material. For instance, in one embodiment, the body shell 21 may be formed entirely from a laminate composite material, such as a carbon fiber reinforced laminate composite or a glass fiber reinforced laminate composite. Alternatively, one or more portions of the body shell 21 may be configured as a layered construction and may include a core material, formed from a lightweight material such as wood (e.g., balsa), foam (e.g., extruded polystyrene foam) or a combination of such materials, disposed between layers of laminate composite material.

Figure 4:
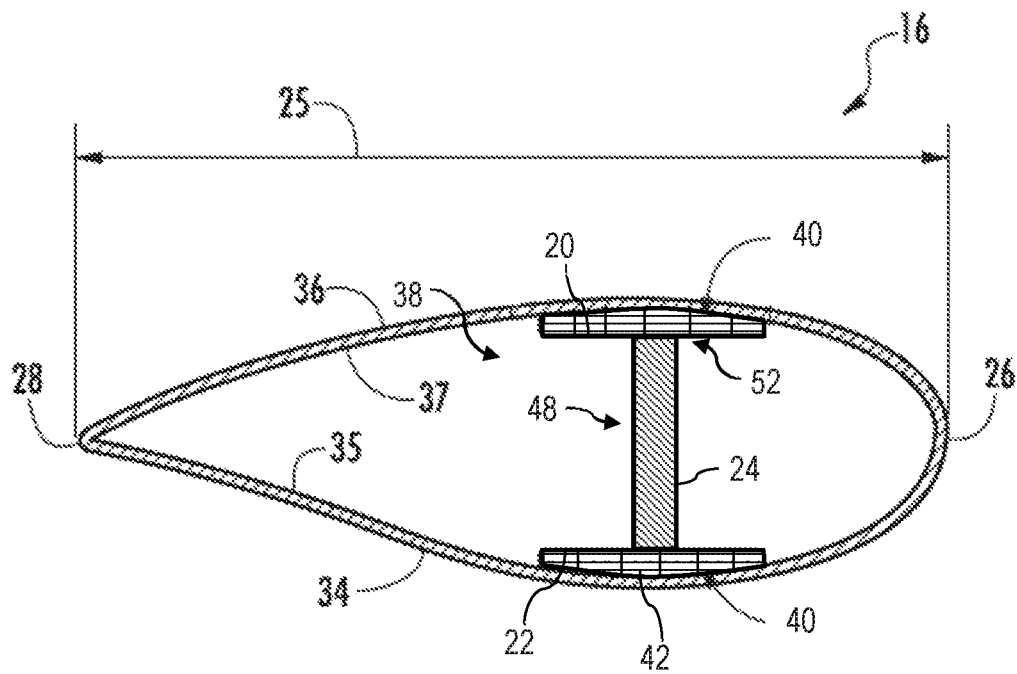
FIG. 4 illustrates a cross-sectional view of a rotor blade and particularly illustrates an I-beam spar with protruded spar caps.

Referring particularly to FIG. 3, the rotor blade 16 may also include one or more longitudinally extending structural components configured to provide increased stiffness, buckling resistance, and/or strength to the rotor blade 16. For example, the rotor blade 16 may include a pair of longitudinally extending spar caps 20, 22 configured to be engaged against the opposing inner surfaces 35, 37 of the pressure and suction sides 34, 36 of the rotor blade 16, respectively. Additionally, one or more shear webs 24 may be disposed between the spar caps 20, 22 so as to form a box-beam spar configuration (FIG. 3) or I-beam spar configuration (FIG. 4). The spar caps 20, 22 are generally designed to control the bending stresses and/or other loads acting on the rotor blade 16 in a generally span-wise direction (a direction parallel to the span 23 of the rotor blade 16) during operation of a wind turbine 10. Similarly, the spar caps 20, 22 may also be designed to withstand the span-wise compression occurring during operation of the wind turbine 10. As mentioned, the joint interface between the spar caps 20, 22 and the shear web 24 is a critical structural concern.

In FIG. 3, the spar caps 20, 22 are formed from rows 62 (FIG. 5) of pultruded members 42 that essentially span the chord-wise aspect of the spar cap 20, 22. In FIG. 4, the spar caps 20, 22 are formed from rows 62 (FIG. 6) and columns 66 (FIG. 6) of the pultruded members 42, wherein a plurality of the pultruded members 42 span the chord-wise aspect of the spar cap.

It should be understood that the pultruded members 42 described herein may be formed using any suitable pultrusion process. For example, the pultruded members 42 are generally formed of reinforced materials (e.g. fibers 44 or woven or braided strands) that are impregnated with a resin material 46 and pulled through a stationary die such that the resin material 46 cures or undergoes polymerization through added heat or other curing methods. For example, in certain embodiments, the heated die may include a mold cavity corresponding to the desired shape of pultruded members 42 such that the mold cavity forms the desired shape in the completed part. The pultruded members 42 may include an outer casing formed using any suitable process, including but not limited to pultrusion, thermoforming, or infusion.

The fibers 44 may include but are not limited to glass fibers, nanofibers, carbon fibers, metal fibers, wood fibers, bamboo fibers, polymer fibers, ceramic fibers, or similar. In addition, the fiber material may include short fibers, long fibers, or continuous fibers.

The pultruded members 42 may include different or varying materials cured together with the resin material 46. More specifically, the pultruded member 42 may include different types of fibers 44 arranged in a certain pattern. The fibers may include glass fibers, carbon fibers, or any other suitable fiber material.

Further, the resin material 46 may include a thermoplastic material or a thermoset material. A thermoplastic material generally encompasses a plastic material or polymer that is reversible in nature. For example, thermoplastic materials typically become pliable or moldable when heated to a certain temperature and solidify upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to, polyolefins, polyamides, fluropolymer, ethyl-methyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material.

Further, a thermoset material generally encompasses a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, esters, epoxies, or any other suitable thermoset material.

The pultruded members 42 can be then joined together to form the spar cap 20 via vacuum infusion, adhesive, semi-preg material, pre-preg material, or any other suitable joining method. In this joining process, a first end section of one or more webs 54-58, such as a flexible fiber material (e.g., glass fiber) web, are woven or interlaced between the pultruded members 42, and an opposite end section of the webs 54-58 extends from the spar cap 20, 22 and are attached to the shear web 24, as described in greater detail below.

In addition, it should be understood that the pultruded members 42 may have any suitable cross-sectional shape, such as the generally rectangular shape depicted in the figures.

As shown in FIG. 3, each of the pultruded members 42 may define a single row 62, with multiple rows 62 stacked atop one another and joined together as discussed above. It should be understood that the arrangement of the pultruded members 42 as shown in the figures is given for illustrative purposes only and is not meant to be limiting. For example, in further embodiments, the spar cap 20 may be constructed of a single pultruded member 42. Alternatively, the spar cap 20 may be constructed of multiple rows 62 and columns 66 of the pultruded members 42, as depicted in FIGS. 4 and 6-8.

Referring to FIGS. 3 and 4 in general, a wind turbine rotor blade component 38 is depicted in one embodiment as a spar configuration within the blade 16. The component includes a first structural component 40 formed from a plurality of stacked pultruded members 42. In a particular embodiment illustrated in the figures, this first structural component 40 may be, for example, a spar cap 20, 22. A second structural component 48 is fixed to the first structural component 40 at a joint interface 52. As illustrated, this second structural component 48 may be, for example, a shear web 24. In FIG. 3, the first and second components 40, 48 form a box-beam spar configuration, and in FIG. 4 the first and second components 40, 48 form an I-beam spar configuration.

Referring to FIGS. 5 through 8 in general, one or more webs 54-60 are used to fix the first 40 and second 48 components together at the joint interface 52. Each of the plurality of webs 54-60 has a first section "a" (i.e., sections 54(a) through 60(a)) and a second section "b" (i.e., sections 54(b) through 60(b)) extending across the joint interface 52. In a first aspect, the present disclosure encompasses an embodiment that utilizes a single web, wherein the first section of this web 59(a) extends along and is bonded to a top outer surface 68(a) of the stacked pultruded members 42 and the second section of this web 59(b) extends across the joint interface 52 and is bonded (directly or indirectly) to the second structural component 48 (e.g., shear web 24) using conventional adhesive or resin bonding techniques.

In further embodiments, additional webs may be used. For example, the first section of a second one of the webs 60(a) extends along and is bonded to a bottom outer surface 68(b) of the stacked pultruded members 42 with the second section of this web 60(b) extending across the joint interface 52 and bonded to the second structural component 48. With this embodiment, additional "internal" webs may or may not be included. In other words, this embodiment encompasses one or more "external" webs extending across the joint interface 52 along the outer surfaces of the structural components 40, 48.

Still referring to FIGS. 5 through 8 in general, other embodiments include one or more additional "internal" webs underlying the outermost webs 59, 60 at the joint interface. For example, one or more additional webs (i.e., sections 54(a) through 58(a)) may be bonded between at least two of the pultruded members 42 in the first structural component 40 (e.g., spar cap 20), with the second section (i.e., sections 54(b) through 58(b)) extending across the joint interface 52 and bonded onto or into the second structural component 48 (e.g., shear web 24) using conventional adhesive or resin bonding techniques.

As mentioned, the improved joint interface structure 52 formed as described above has particular usefulness when configured between a spar cap 20, 22 and a shear web 24 in a box-beam (FIG. 3) or I-beam (FIG. 4) spar, wherein the spar cap 20, 22 is formed by the pultruded members 42 and the shear web is a unitary (FIGS. 5-7) or multi-element (FIG. 8) component. It should be appreciated, however, the joint interface structure 52 is not limited to this use or location, and may be used between any structural components within the wind turbine 10 or blade 16.

The webs 54-60 may be variously formed. In one embodiment, the webs 54-60 may be one or more layers of a woven or non-woven fabric materials, such as a glass matt fabric, that is sufficiently pliable so as to be woven between different ones of the pultruded members 42, yet strong enough to form a rigid load-bearing joint interface 52 between the components. The fabric layers 54-58 may be bonded between the pultruded members 42 with an adhesive or resin during formation of the first structural member 40, for example during a vacuum thermo-forming process.

In a particular embodiment, the fabric material webs 54-58 may be impregnated with a resin or adhesive and also serve a primary purpose of adhering or bonding the pultruded members 42 together to form the first structural member 40. In such embodiment, the webs 54-58 may extend entirely throughout the width and length of the first structural member 40 between adjacent rows 62 and/or columns 66 of the pultruded members 42.

Figure 5:
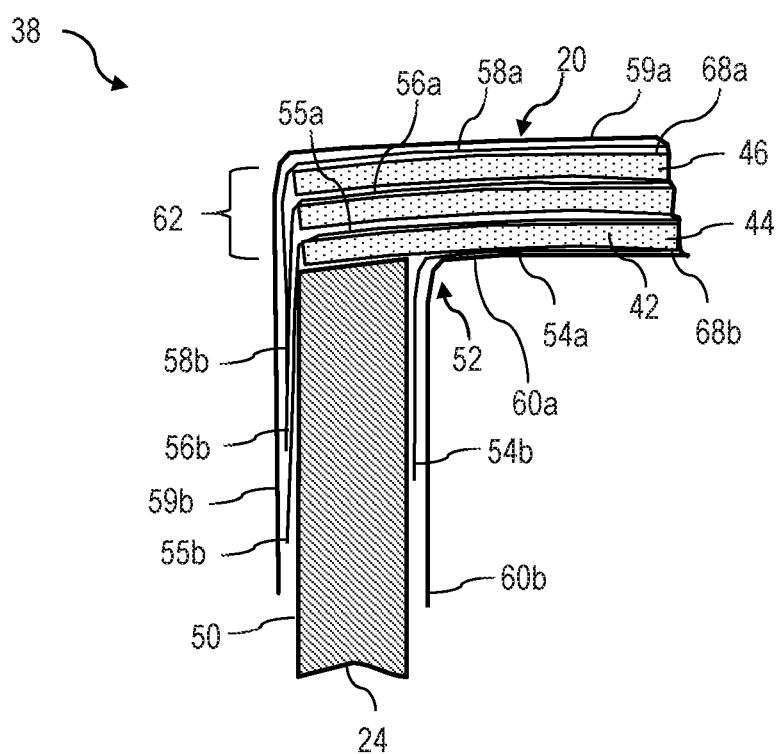
FIG. 5 is a partial cross-section view of an interface junction between the spar cap and shear web in a box-beam spar configuration in accordance with aspects of the invention.
Figure 6:
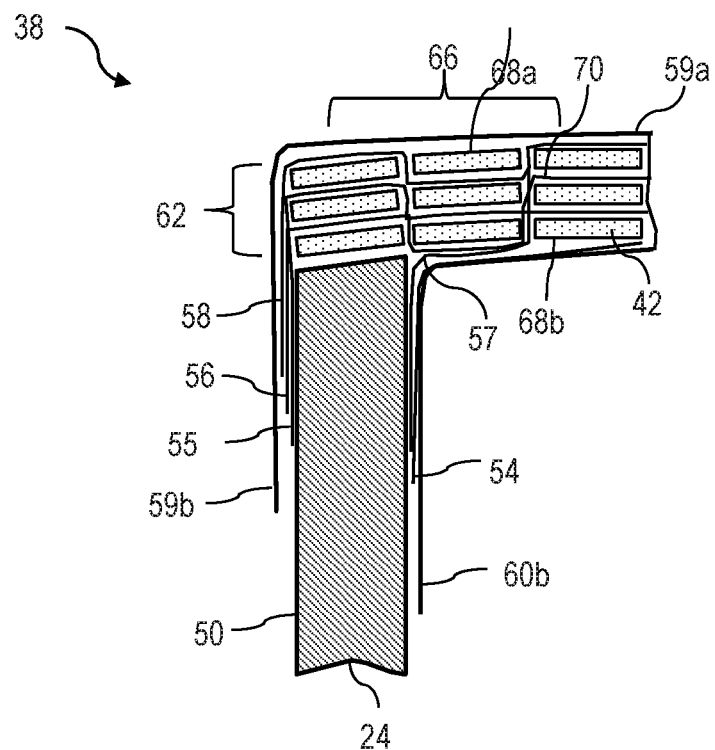
FIG. 6 is a partial cross-section view of another embodiment of an interface junction between the spar cap and shear web in a box-beam spar configuration.
Figure 7:
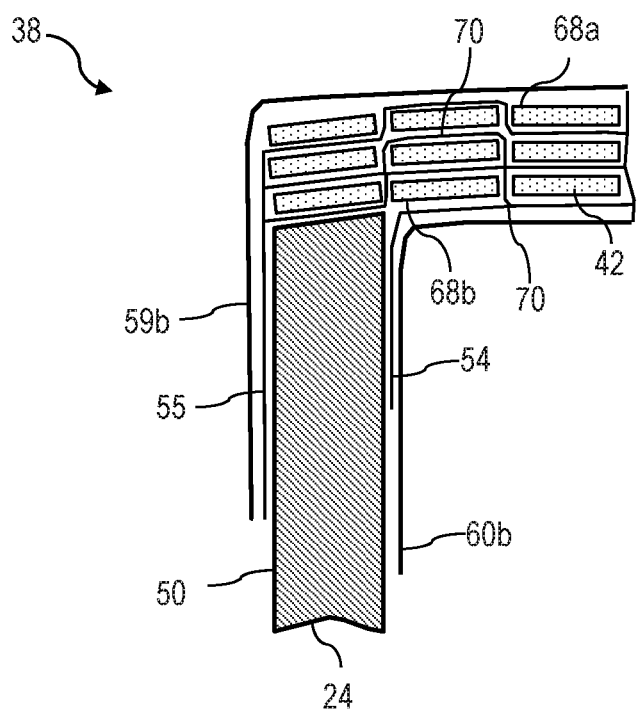
FIG. 7 is a partial cross-section view of yet another embodiment of an interface junction between the spar cap and shear web in a box-beam spar configuration.

The second structural component 48 may be a unitary member, such as the shear web 24 depicted in FIGS. 5 through 7, wherein the second section of each of the plurality of webs 54(b) through 60(b) extends alongside an outer surface 50 of the second structural component. The second sections of multiple webs 54(b)-60(b) may overlap along the outer surface 50 of the second structural component 40, wherein such overlapped sections are bonded to each other and to the outer surface 50 of the second structural component 48.

Figure 8:
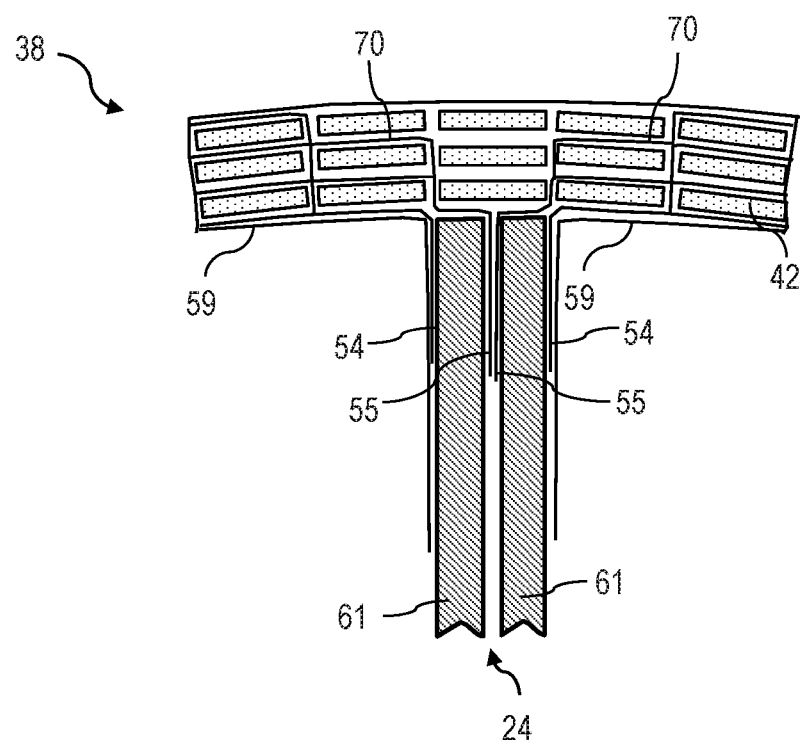
FIG. 8 is a partial cross-section view of an embodiment of an interface junction between the spar cap and shear web in an I-beam spar configuration.

In an alternate embodiment depicted for example in FIG. 8, the second structural component 48 may be formed from a plurality of bonded-together components 61, wherein the second section (b) of at least one of the plurality of webs 54(b)-60(b) extends and is bonded between two or more of the bonded-together components 60. In a particular embodiment, the second structural component 48 may also be formed from a plurality of pultruded components 60, as discussed above with respect to the first structural component 40.

As discussed above, the pultruded members 42 may be arranged in various configurations within the first structural component 40. For example, as depicted in FIGS. 3 and 5, the pultruded members 42 may span across the entire chord-wise aspect of the first structural component 40 and be arranged in stacked rows 62. The first section of one or more of the plurality of webs 54(a)-58(a) is bonded between two adjacent stacked rows 62. For example, the first section of at least one of the webs 54(a)-58(a) may be bonded between each of the stacked rows 62 of pultruded members 42, as shown in FIG. 5.

As seen in FIGS. 6-8, the pultruded members 42 may be further arranged in adjacent columns 66 within the first structural member 40, wherein the first section of at least one of the plurality of webs 54(a)-54(b) is bonded between the pultruded members 42 at different height positions in adjacent ones of the columns 66. In addition, the webs may weave between the columns 66 at a different height between adjacent columns 66.

It should be appreciated that the first section of a plurality of the webs 54(a)-58(a) may weave between any combination of the stacked rows 62 and columns 66 of pultruded members 42 within the first structural component 40 (or the second structural component 48 if formed from pultruded components 60 or other separate components).

Referring to FIGS. 6 and 7, in certain embodiments, the first sections of multiple webs 54(a)-58(a) may be joined together within the first structural component 40 to form an interconnected network of the first sections. Alternatively, the first section of one or more of the webs 54(a)-58(a) may include a plurality of branches 70, wherein each branch 70 extends between different pairs of the pultruded members 42. It should be appreciated that the first sections 54(a)-58(a) need not remain separated or distinct within the matrix of pultruded members 42, but may attach or combine in any pattern between the pultruded members 42.

The present invention also encompasses various methodologies for fixing a first structural component 40, such as a spar cap 20, 22, to a second structural component 48, such as a shear web 24, with a plurality of webs 54-58, wherein the first structural component 40 is formed with a plurality of stacked pultruded members 42, as discussed above. In a first aspect, the method includes bonding (directly or indirectly) the first section of at least a first web 59(a) along and to a top outer surface 68(a) of the stacked pultruded members 42, with the second section of this web 59(b) extending across the joint interface 52 and bonded (directly or indirectly) to the second structural component 48 (e.g., shear web 24) using conventional adhesive or resin bonding techniques. In an additional embodiment, the first section of a second one of the webs 60(a) extends along and is bonded to a bottom outer surface 68(b) of the stacked pultruded members 42 with the second section of this web 60(b) extending across the joint interface 52 and bonded to the second structural component 48.

Additional method embodiments may include bonding one or more additional webs underlying the outermost webs 59, 60 at the joint interface 52. For example, one or more additional webs (i.e., sections 54(a) through 58(a)) may be bonded between at least two of the pultruded members 42 in the first structural component 40 (e.g., spar cap 20), with the second section (i.e., sections 54(b) through 58(b)) extending across the joint interface 52 and bonded onto or into the second structural component 48 (e.g., shear web 24) using conventional adhesive or resin bonding techniques. These "internal" webs may be in addition to the external webs 59, 60.

In a particular embodiment of the method, the first structural component 40 is a spar cap 20, 22, and the second structural component 48 is a shear web 24.

The pultruded members 42 may be arranged in stacked rows 62 and columns 66 in the spar cap 20, 22, wherein the method includes weaving the first section of at least one of the plurality of webs 54(a)-58(b) between any combination of the stacked rows and columns of pultruded members 42.

It should be appreciated that the various method embodiments may include any of the aspects discussed above with respect to FIGS. 5 through 8.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade component for a wind turbine, the rotor blade component comprising:
 a first structural component comprising a plurality of stacked pultruded members;
 a second structural component fixed to a bottom surface of the first structural component at a joint interface; and
 at least one web at the joint interface, the web comprising a first section and a second section;
 the first section of the web extending along and bonded to a top outer surface of the first structural component that is opposite from the bottom surface of the first structural component and the second section of the web extending across the joint interface and bonded to a first side of the second structural component;
 a second web having a first section extending along and bonded to a bottom outer surface of the first structural component and a second section extending across the joint interface and bonded to a second side of the second structural component that is opposite to the first side; and
 a plurality of additional webs each having a first section and a second section, wherein the first section of at least one of the plurality of additional webs is bonded between at least two of the pultruded members in the first structural component with the second section extending across the joint interface and bonded onto or into the second structural component.

2. The rotor blade component of claim 1, wherein the second sections of multiple ones of the plurality of additional webs extend alongside and overlap on an outer surface of the second structural component, the first section of the web overlying the overlapping second sections of the multiple ones of the plurality of additional webs.

3. The rotor blade component of claim 1, wherein the second structural component comprises a plurality of bonded-together components, the second section of at least one of the plurality of additional webs extending between two or more of the bonded-together components.

4. The rotor blade component of claim 1, wherein the pultruded members are arranged in stacked rows in the first structural component, the first section of at least one of the plurality of additional webs extending between adjacent ones of the stacked rows.

5. The rotor blade component of claim 4, wherein the pultruded members are further arranged in adjacent columns, wherein the first section of at least one of the plurality of additional webs extends between the pultruded members at different height positions in adjacent ones of the columns.

6. The rotor blade component of claim 1, wherein the pultruded members are arranged in stacked rows and columns in the first structural component, the first section of at least one of the plurality of additional webs weaving between a combination of the stacked rows and columns with the second section bonded on or into the second structural component.

7. The rotor blade component of claim 1, wherein the first section of at least one of the plurality of additional webs is joined to the first section of another one of the plurality of additional webs in the first structural component.

8. The rotor blade component of claim 1, wherein the first section of at least one of the plurality of additional webs comprises a plurality of branches, each of the branches extending between different pairs of the pultruded members.

9. The rotor blade component of claim 1, wherein the first structural component comprises a spar cap, and the second structural component comprises a shear web.

10. The rotor blade component of claim 9, wherein the shear web is fixed to an end of the spar cap in a box-beam spar configuration or is fixed to an intermediate position on the spar cap in an I-beam spar configuration.

11. A method for fixing a first structural component to a second structural component at a joint interface within a wind turbine rotor blade with a plurality of webs, wherein the first structural component is formed from a plurality of stacked pultruded members and the second structural component is fixed to a bottom surface of the first structural component, the method comprising:
 bonding a first section of a first one of the plurality of webs onto a top outer surface of the first structural component that is opposite to the bottom surface of the first structural component and bonding the second section across the joint interface and onto an outer surface of the second structural component;
 bonding a first section of a second one of the plurality of webs along the bottom surface of the first structural component and bonding a second section across the joint interface and onto an inner surface of the second structural component that is opposite to the outer surface; and
 bonding a plurality of additional webs each having a first section and a second section, wherein the first section of at least one of the plurality of additional webs is bonded between at least two of the pultruded members in the first structural component with the second section extending across the joint interface and bonded onto or into the outer surface or the inner surface of the second structural component.

12. The method of claim 11, wherein the pultruded members are arranged in stacked rows and columns in the first structural component, and further comprising weaving the first section of at least one of the additional webs between a combination of the stacked rows and columns of the pultruded members.

13. The method of claim 11, wherein the second structural component comprises a plurality of bonded-together components, the method comprising bonding the second section of at least one of the additional webs between two or more of the bonded-together components in the second structural component.

* * * * *